United States Patent Office 2,736,711
Patented Feb. 28, 1956

2,736,711

LUMINESCENT SILICATES

Pamela Elfrida Gooding, Ruislip, and Alfred Hamilton McKeag, North Wembley, England No Drawing. Application July 24, 1952,
Serial No. 300,768

Claims priority, application Great Britain July 31, 1951

4 Claims. (Cl. 252—301.4)

This invention relates to luminescent materials and to the manufacture thereof; the invention relates also to combinations of such materials with means for exciting them to luminescence, for example, electric discharge lamps and cathode ray tubes.

A particular object of the invention is to provide luminescent materials of novel composition which are excited by ultra-violet radiation of wavelength 3650 A. to luminescence of a colour which renders them suitable for use in high pressure mercury vapour electric discharge lamps for modifying or correcting the colour of the light from the mercury vapour discharge.

Materials in accordance with the invention may, however, have other uses. For example, most, if not all, of them are excited by ultra-violet radiation of other wavelengths, for example, 2537 A., and are suitable for other uses, for example, in low pressure mercury vapour fluorescent lamps for lighting or display purposes. Again, for example, many of the materials in accordance with the invention are also excited by cathode rays and are suitable for use in the screens of cathode ray tubes.

According to the invention an artificial luminescent material consists of or includes a silicate matrix composed of the oxides of lithium, silicon, and barium and/or strontium, activated by cerium so as to be excitable to luminescence by ultra-violet radiation of wavelength 3650 A. The material may also contain manganese as an additional activator.

The luminescent materials according to the invention may be referred to as (barium, strontium) lithium silicates, but it is to be understood that this nomenclature does not carry any implications with regard to the relative stoichiometric proportions of the oxides present. With this understanding, it may be said that the term (barium, strontium) lithium silicate is used as a compendious term including each and all of barium lithium silicate, strontium lithium silicate, and barium strontium lithium silicates with different barium strontium ratios, each of these silicates being activated by cerium and optionally also by manganese. The luminescent materials may be produced by heating in a reducing atmosphere a mixture of compounds of barium and/or strontium, lithium and silicon, which compounds will produce a (barium, strontium) lithium silicate as a result of the heating, together with a compound of cerium and optionally also a compound of manganese, preferably the said compounds are oxides or compounds from which the oxides are formed by chemical reaction or decomposition during the heating.

The luminescent materials of the invention when activated by cerium alone are excited by ultra-violet radiation, especially of wavelength 3650 A., to luminescence of a blue or violet colour, the materials in which the alkaline earth component is predominantly barium oxide showing blue luminescence, while materials in which strontium oxide is the predominant alkaline earth show luminescence of a colour approaching violet. When manganese is included as an additional activator, the colours of luminescence shown by these materials are predominantly red, although some compositions show luminescence of a violet or bluish colour: a wide range of shades or red and bluish-red is obtained with materials activated by both cerium and manganese, depending on variations in the compositions of the materials in a manner to be discussed hereinafter. In general, the colour becomes increasingly red with increasing manganese content; manganese alone in the absence of cerium does not impart any appreciable luminescence to the materials under ultra-violet radiation.

We have found that useful luminescent materials can be obtained having a very wide range of compositions of the (barium, strontium) lithium silicate matrix. Materials with particularly useful luminescent properties are obtained from starting materials in which the molar ratio of $BaO + SrO + Li_2O : SiO_2$ is between 3:1 and 1:1; the molar ratio of $BaO + SrO : Li_2O$ in these starting materials is preferably in the range from 5:1 to 1:5. The preferred materials in accordance with the invention are those obtained from starting materials in which the molar ratio of $BaO + SrO : Li_2O$ is from 3:1 to 1:3 and the molar ratio of $BaO + SrO + Li_2O : SiO_2$ is from 3:1.7 to 3:2.3.

The amount of cerium incorporated as activator in the luminescent materials of the invention is not critical: thus any proportion from about 1% to about 20% by weight may be used to produce useful luminescent materials, the maximum brightness of luminescence being obtained with materials containing about 5% to 10% of cerium by weight. The manganese content is more critical and should not be greater than about 5% by weight since the luminescence becomes less bright with greater additions of manganese. The manganese content for optimum brightness appears to be about 0.5% to 2%, although the manganese content may be modified in accordance with the colour of luminescence which it is desired to obtain. Throughout this specification the proportions of the activator mentioned are the proportions included in the starting materials calculated as percentages of the weight of the matrix of the final product.

Materials which we have found to give red fluorescence which is particularly valuable for colour correction in high pressure mercury vapour lamps are those having substantially the overall matrix composition represented by the molar ratio $1BaO : 1SrO : 1Li_2O : 2.2SiO_2$, with 10% cerium and 1% managanese as activators: the proportion of silica in these materials may be from 2.1 to 2.2 moles.

The colours of luminescence shown by the luminescent materials of the invention containing both cerium and manganese as activators are affected by a number of variable factors in the compositions of the materials. These factors include the relative proportions of strontium and barium oxides, the lithia content in relation to the total alkaline earth content, and the silica content.

With regard to the variations in the relative proportions of strontium and barium, we have found that when strontium is predominant the red luminescence tends towards violet-red, and when barium is predominant the red luminescence tends towards orange-red. The variations in colour obtained by varying the SrO/BaO ratio are illustrated by the following table (Table I) which shows the range of colours obtained with materials of the overall composition:

$$2(Sr,Ba)O : 1Li_2O : 2.2SiO_2$$

activated with 8% of cerium and 2% of manganese.

TABLE I

| SrO, Molar Proportion | BaO, Molar Proportion | Colour of luminescence (3650 A. radiation) |
|---|---|---|
| 2.0 | | Violet pink. |
| 1.5 | 0.5 | Rose pink. |
| 1.0 | 1.0 | Rose red. |
| 0.5 | 1.5 | Rose. |
| | 2.0 | Pale orange rose. |

The results of X-ray examination of a series of materials in which the relative proportions of barium oxide and strontium oxide are varied while the lithia, silica and activator contents are kept constant, shows that such a series of materials forms essentially a series of solid solutions.

A decrease in the ratio of alkaline earth to lithia, for a given silica content, in general produces a change towards more bluish reds. With regard to the variations in the silica content we have found that the red colour is most pronounced in materials obtained from starting materials containing about 2 moles of silica to 3 moles of alkaline earth+lithia, the colours tending towards violet or blue with higher silica contents, while there is a slight increase in the yellow emission with decreasing silica content below about 2 moles.

Variations in the cerium content appear to have little effect on the colour, mainly affecting the brightness of the luminescence, as already stated, while, as mentioned above, the colour becomes increasingly red with increasing manganese content.

The following table (Table II) shows variations in the colour of luminescence in materials of the overall matrix composition $1BaO : 1SrO : 1Li_2O : 2.2SiO_2$ over a range of contents of cerium and manganese:

TABLE II

| Percent Ce | Percent Mn | Colour of luminescence (3650 A. radiation) |
|---|---|---|
| 5 | 0 | Blue. |
| 5 | 0.5 | Deep rose. |
| 5 | 1.0 | Rose red. |
| 5 | 1.5 | Do. |
| 5 | 2.0 | Do. |
| 5 | 5.0 | Red. |
| 10 | 0 | Blue. |
| 10 | 0.5 | Deep rose. |
| 10 | 1.0 | Pale rose red. |
| 10 | 1.5 | Rose red. |
| 10 | 2.0 | Red. |
| 10 | 5.0 | Do. |
| 15 | 0 | Blue. |
| 15 | 0.5 | Violet pink. |
| 15 | 1.0 | Pale rose red. |
| 15 | 1.5 | Rose red. |
| 15 | 2.0 | Do. |
| 15 | 5.0 | Red. |

It will be appreciated that the names given to the colours throughout this specification, as well as in the tables, are only comparative, and that it is extremely difficult, if not impossible, to describe accurately the wide range of colours which can be obtained with this series of luminescent materials.

The following table (Table III) indicates the mutual effects of variations in the contents of silica, cerium and manganese on the colour of luminescence, in the range of materials in which the molar ratio of $BaO : SrO : Li_2O$ is $1 : 1 : 1$, under excitation of radiation of wavelength 3650 A.:

The luminescent materials of the invention have a good temperature stability and since they are excited to luminescence by ultraviolet radiation of wavelength 3650 A. they are particularly suitable for use in high pressure mercury vapour fluorescent electric discharge lamps, especially for correcting the colour of the light from the mercury vapour discharge, for which latter purpose both the blue- and red-fluorescing materials are useful. In such lamps, the materials in accordance with the invention may be applied in the form of a coating on the inner surface of a glass bulb surrounding the discharge envelope, as usual in such lamps.

Materials in accordance with the invention may, however, also be usefully employed in low pressure fluorescent lamps and for fluorescent screens in cathode ray tubes.

In the manufacture of luminescent materials in accordance with the invention, the preferred compounds for use as starting materials are the carbonates of barium and strontium, the nitrate or carbonate of lithium, silica, an oxide or nitrate of cerium and a chloride or carbonate of manganese. The starting materials are mixed thoroughly, for example, by being milled together, and the mixture is heated for a period of from one to five hours at a suitable temperature, for example, between 700° C. and 1,000° C. We believe that the effect of performing the heating in a reducing atmosphere is to ensure that the cerium is incorporated in the product in the trivalent state. The preferred reducing atmosphere is hydrogen, and we have found that it is usually desirable to carry out the heating in two or more steps, the material being ground after each heating, in order to obtain the optimum luminescent properties.

Preferably, to ensure complete reaction of the compounds of barium and/or strontium, lithium and silicon, these compounds are prefired together in air at a temperature of 700° C. to 800° C., before the compounds of cerium and manganese are added; after the addition of the activator compounds, a further firing step or steps is or are carried out, usually at higher temperatures, as required to complete the production of the luminescent material. It should be noted that materials containing a single alkaline earth, that is to say barium oxide or strontium oxide, usually require longer firing to ensure complete reaction than is the case with materials of intermediate compositions containing both strontium oxide and barium oxide: thus materials containing barium oxide or strontium oxide alone should usually be fired for a total time of at least 3 hours after the introduction of the activators.

It is to be understood that the materials used in the production of the luminescent materials of the invention must be of a high degree of purity, as is usual in the art of luminescent materials manufacture. The strontium carbonate employed is preferably prepared by precipitation from solutions of strontium chloride and ammonium carbonate.

In a preferred method of preparing strontium carbonate, described by way of example, 1.867 kgm. of

TABLE III

| $SiO_2$ (moles) | 0.5% Manganese | | | | | 1% Manganese | | | | | 1.5% Manganese | | | | |
|---|---|---|---|---|---|---|---|---|---|---|---|---|---|---|---|
| | 1% CE. | 5% CE. | 10% CE. | 15% CE. | 20% CE. | 1% CE. | 5% CE. | 10% CE. | 15% CE. | 20% CE. | 1% CE. | 5% CE. | 10% CE. | 15% CE. | 20% CE. |
| 2.2 | Deep Rose. | Deep Rose. | Deep Rose. | Violet Pink. | Violet Pink. | Rose Red. | Rose Red. | Pale Rose Red. | Pale Rose Red. | Pink. | Rose Red. | Rose Red. | Rose Red. | Rose Red. | Deep Rose Red. |
| 2.1 | Purple. | ---do----- | Violet Pink. | Lilac. | Pale Lilac. | Deep Rose. | ---do--- | ---do--- | ---do--- | Pale Pink. | Deep Rose. | ---do--- | ---do--- | ---do--- | Pale Rose Red. |
| 2.0 | ---do----- | ---do----- | Lilac. | Pale Lilac. | ---do----- | ---do--- | ---do--- | Pale Pink. | Pale Pink. | ---do--- | Rose Red. | ---do--- | Pale Rose Red. | Pale Rose Red. | Pale Pink. |
| 1.9 | ---do----- | Pale Lilac. | Pale Lilac. | ---do----- | ---do----- | ---do--- | Pink. | ---do--- | ---do--- | ---do--- | ---do--- | Pale Rose Red. | Pink. | ---do--- | Deep Rose. |
| 1.8 | ---do----- | ---do----- | ---do----- | ---do----- | ---do----- | ---do--- | ---do--- | ---do--- | ---do--- | ---do--- | ---do--- | ---do--- | ---do--- | ---do--- | Pale Pink. | strontium chloride are dissolved in 3 litres of distilled water and 0.672 kgm. of ammonium carbonate are dissolved in 3 litres of distilled water; these solutions are filtered and the strontium chloride solution is added slowly to the ammonium carbonate solution with constant stirring. The resulting precipitate and mother liquid are allowed to stand for two hours before filtration, the precipitate is then washed thoroughly with distilled water and dried at 200° C.

Some specific methods of preparing luminescent materials in accordance with the invention will now be described by way of example. The materials are, of course, all ground and sieved for use after the final firing.

It may be noted that Examples 1, 2, 3 and 4 describe the preparation of materials containing varying relative proportions of barium oxide and strontium oxide, while the lithia and silica contents are kept constant; Examples 5–10 inclusive illustrate the effect of varying the ratio of alkaline earth to lithia while the ratio of barium oxide to strontium oxide is kept constant at 1:1; in the materials described in Examples 11 and 12 the alkaline earth component consists entirely of barium oxide, and the ratio of barium oxide to lithia is varied; and Examples 13, 14 and 15 illustrate the effect of varying the silica content while the ratio of BaO:SrO:Li₂O is kept constant at 1:1:1.

*Example 1*

For the production of a luminescent material of the overall composition represented by the ratio 1BaO: 1SrO:1Li₂O:2.2SiO₂, activated by 10% cerium and 1% manganese, a mixture of the following materials is first prepared.

| | Grams |
|---|---|
| Barium carbonate (BaCO₃) | 47 |
| Strontium carbonate (SrCO₃) | 35 |
| Lithium carbonate (Li₂CO₃) | 17.6 |
| Silica (SiO₂) | 31.5 |

The barium carbonate and lithium carbonate are of the purest grade obtainable, and the lithium carbonate is ball milled before use to reduce the particle size. The strontium carbonate is prepared in the manner described above, and the silica used, in this and all the subsequent examples, is that known under the trade name "Mallinckrodt" grade, specially prepared for the manufacture of luminescent materials: "Mallinckrodt" grade silica contains a proportion of water, but the amounts of silica given in these examples are the amounts of pure dry SiO₂.

The above mixture is lightly ground together and is fired for two hours at 800° C. in open silica trays. After cooling, the fired mixture is reground and mixed with 12.3 gms. of ceric oxide, CeO₂, and a solution of 3.6 gms. of manganous chloride, MnCl₂4H₂O, in 100 ml. of distilled water. The paste thus produced is dried at 200° C., the dry material is again mixed thoroughly and is fired in silica tubes in an atmosphere of hydrogen at 900° C. for one hour. The fired material is allowed to cool in hydrogen, is reground and refired at 900° C. for a further period of one hour; the regrinding and refiring operations are repeated until the optimum fluorescence is obtained, three firings usually being sufficient.

The product exhibits a strong rose-red fluorescence under excitation by ultra-violet radiation of 3650 A. wavelength. A material prepared in this way has been examined by X-ray analysis and found to consist substantially of a single phase; the interplanar spacings (d) and relative intensities of twelve principal X-ray reflections given by this material are shown in Table IV: these data were obtained by the method of X-ray analysis described in the pamphlet designated by No. E43–49T, issued by the American Society for Testing Materials in 1942, as revised in 1946 and 1949. The inter-planar spacings have not been corrected for absorption.

TABLE IV

| $d$ (A.) | Relative intensities |
|---|---|
| 4.718±.005 A | weak. |
| 4.047±.005 A | weak medium. |
| 3.671±.005 A | medium. |
| 3.427±.005 A | weak medium. |
| 3.319±.005 A | Do. |
| 3.000±.005 A | Do. |
| 2.905±.005 A | strong. |
| 2.819±.005 A | very strong. |
| 2.391±.005 A | medium. |
| 2.313±.005 A | Do. |
| 2.021±.005 A | Do. |
| 1.932±.005 A | weak medium. |

This phase has also been observed in other materials in accordance with the invention which have been examined by X-ray analysis, sometimes in association with a second phase which has not yet been fully investigated.

*Example 2*

To produce a strontium lithium silicate having the overall composition 2SrO:1Li₂O:2.2SiO₂, with 8% cerium and 2% manganese, the following ingredients are employed:

| | Grams |
|---|---|
| Strontium carbonate (SrCO₃) | 20.1 |
| Lithium nitrate (LiNO₃3H₂O) | 16.6 |
| Silica (SiO₂) | 8.9 |
| Cerium nitrate (Ce(NO₃)₃.6H₂O) | 7.7 |
| Manganese carbonate (MnCO₃) | 1.05 |

The strontium carbonate, lithium nitrate and cerium nitrate used are the commercially available pure grades, the strontium carbonate is prepared in the manner described above, and the manganese carbonate is prepared by precipitation from solutions of manganese chloride and ammonium carbonate.

The mixture of the above materials, all in finely divided form, is fired at 900° C., for one hour in hydrogen, is allowed to cool in hydrogen and is then reground, refired for a further hour at 900° C. in hydrogen and allowed to cool in hydrogen.

The material thus prepared shows a strong violet-pink fluorescence under excitation by ultra-violet radiation of wavelength 3650 A.

*Example 3*

For the preparation of a barium lithium silicate of the overall composition 2BaO:1Li₂O:2.2SiO₂, activated by 8% cerium and 2% managanese, a mixture of the following composition is prepared:

| | Grams |
|---|---|
| Barium carbonate (BaCO₃) | 21.1 |
| Lithium nitrate (LiNO₃.3H₂O) | 13.3 |
| Silica (SiO₂) | 7.0 |
| Cerium nitrate (Ce(NO₃)₃.6H₂O) | 7.7 |
| Manganese carbonate (MnCO₃) | 1.05 |

These materials are similar to those employed in the previous examples.

The mixture is treated in the manner described in Example 2, and the product thus obtained exhibits strong fluorescence of a pale orange-rose colour under excitation by ultra-violet radiation of wavelength 3650 A.

*Example 4*

For the preparation of a material of the overall composition 1.4BaO:0.6SrO:1Li₂O:2.2SiO₂, activated by 10% cerium and 1% manganese, a mixture of the following constituents is made up by shaking the powdered substances together:

| | Grams |
|---|---|
| Barium carbonate (BaCO₃) | 157 |
| Strontium carbonate (SrCO₃) | 50.5 |
| Lithium carbonate (Li₂CO₃) | 42 |
| Silica (SiO₂) | 75 |

This mixture is fired in an open silica tray for two hours at 750° C.

The fired powder is ground with 30.75 gms. of cerium oxide, and made into a paste with 200 ccs. of an aqueous solution of manganous chloride (containing 9.04 gms. $MnCl_2.4H_2O$). This paste is dried in an oven at 250° C., is then ground, and the resulting powder is fired in a silica tube in hydrogen for one hour at 800° C., again for one hour at 825° C., and finally for one hour at 875° C. After each firing the product is allowed to cool in hydrogen and is ground.

The powder obtained by grinding and sieving the final product shows a good orange-rose fluorescence under 3650 A. radiation.

*Example 5*

For the preparation of a barium strontium lithium silicate of the overall composition $$0.9BaO:0.9SrO:1.2Li_2O:2.2SiO_2$$

activated by 10% cerium and 1% manganese, a mixture of the following composition is used:

| | Grams |
|---|---|
| Barium carbonate ($BaCO_3$) | 11.1 |
| Strontium carbonate ($SrCO_3$) | 8.3 |
| Lithium carbonate ($Li_2CO_3$) | 5.55 |
| Silica ($SiO_2$) | 8.25 |
| Cerium oxide ($CeO_2$) | 3.07 |
| Manganese chloride ($MnCl_2.4H_2O$) | 0.9 |

The materials are all of high commercial purity and are similar to those employed in the previous examples.

The manganese chloride is dissolved in 35 ccs. of distilled water and this solution is made into a paste with the other constituents, all in finely divided form, and the paste is dried in an open dish in an oven at 200° C.

The dried material is then ground and fired in a silica tube in an atmosphere of hydrogen for one hour at 875° C., cooled for half an hour in hydrogen, reground and refired in hydrogen at 900° C. for one hour and allowed to cool in hydrogen.

The material thus prepared shows a strong rose fluorescence when excited by ultraviolet radiation of wavelength 3650 A.

*Example 6*

For the preparation of a barium strontium lithium silicate of the overall composition $$0.75BaO:0.75SrO:1.5Li_2O:2.2SiO_2$$

activated by 10% cerium and 1% manganese, a mixture of the following composition is used:

| | Grams |
|---|---|
| Barium carbonate ($BaCO_3$) | 10.0 |
| Strontium carbonate ($SrCO_3$) | 7.5 |
| Lithium carbonate ($Li_2CO_3$) | 7.5 |
| Silica ($SiO_2$) | 8.94 |
| Cerium oxide ($CeO_2$) | 3.07 |
| Manganese chloride ($MnCl_2.4H_2O$) | 0.9 |

The materials used are as in Example 5 and the mixture is prepared and fired as in Example 5. The resulting material shows a strong rose fluorescence when excited by 3650 A. radiation.

*Example 7*

For the preparation of a material of the overall composition $1.15BaO:1.15SrO:0.7Li_2O:2.2SiO_2$, activated by 10% cerium and 1% manganese, a mixture of the following constituents is made up by shaking the powdered substances together:

| | Grams |
|---|---|
| Barium carbonate ($BaCO_3$) | 126 |
| Strontium carbonate ($SrCO_3$) | 95 |
| Lithium carbonate ($Li_2CO_3$) | 29 |
| Silica ($SiO_2$) | 74 |

This mixture is fired in an open silica tray for two hours at 750° C.

The fired powder is ground with 30.75 gms. cerium oxide, and made into a paste with 200 ccs. manganous chloride (containing 9.04 gms. $MnCl_24H_2O$). This paste is dried in an oven at 250° C., is then ground, and the resulting powder is fired in a silica tube in hydrogen for one hour at 875° C. and again for one hour at 900° C. After each firing the product is allowed to cool in hydrogen and is ground.

The powder obtained by grinding and sieving the final product shows a moderate rose fluorescence under 3650 A.

*Example 8*

A material of overall composition $$0.5BaO:0.5SrO:2Li_2O:2.2SiO_2$$

activated by 10% cerim and 1% manganese, is prepared by a method similar to that described in Example 4 using the following starting materials:

| | Grams |
|---|---|
| Barium carbonate ($BaCO_3$) | 77 |
| Strontium carbonate ($SrCO_3$) | 57.5 |
| Lithium carbonate ($Li_2CO_3$) | 116 |
| Silica ($SiO_2$) | 103 |

After the addition of the cerium oxide and manganous chloride, three firing steps are carried out in hydrogen at temperatures of 875° C., 900° C. and 925° C. respectively.

The powder obtained by grinding and sieving the final product shows a moderate pink fluorescence under 3650 A.

*Example 9*

A material of the overall composition $$0.25BaO:0.25SrO:2.5Li_2O:2.2SiO_2$$

activated by 10% cerium and 1% manganese, is prepared by a method similar to that described in Example 4 using the following starting materials:

| | Grams |
|---|---|
| Barium carbonate ($BaCO_3$) | 45.6 |
| Strontium carbonate ($SrCO_3$) | 34 |
| Lithium carbonate ($Li_2CO_3$) | 171 |
| Silica ($SiO_2$) | 122 |

After the addition of the cerium oxide and manganous chloride, three firing steps are carried out in hydrogen at temperatures of 850° C., 875° C. and 900° C. respectively.

The powder obtained by grinding and sieving the final product shows a moderate lilac fluorescence under 3650 A.

*Example 10*

A material of the overall composition $$1.25BaO:1.25SrO:0.5Li_2O:2.2SiO_2$$

activated by 10% cerium and 1% manganese, is prepared by a method similar to that described in Example 4, using the following starting materials:

| | Grams |
|---|---|
| Barium carbonate ($BaCO_3$) | 131 |
| Strontium carbonate ($SrCO_3$) | 98 |
| Lithium carbonate ($Li_2CO_3$) | 19.8 |
| Silica ($SiO_2$) | 70.5 |

After the addition of the cerium oxide and manganous chloride, three firing steps are carried out in hydrogen at temperatures of 900° C., 925° C. and 950° C. respectively.

The powder obtained by grinding and sieving the final product shows a moderate rose fluorescence under 3650 A.

*Example 11*

For the preparation of a barium lithium silicate of the overall composition 1.2BaO:1.8Li₂O:2.2SiO₂, activated by 10% cerium and 1% manganese, a mixture of the following composition is used:

| | Grams |
|---|---|
| Barium carbonate (BaCO₃) | 16.0 |
| Lithium carbonate (Li₂CO₃) | 9.0 |
| Silica (SiO₂) | 8.94 |
| Cerium oxide (CeO₂) | 3.07 |
| Manganese chloride (MnCl₂.4H₂O) | 0.9 |

The materials used are as in Example 5 and the mixture is prepared and fired as in Example 5. The resulting material shows a strong pale rose fluorescence under excitation by 3650 A. radiation.

*Example 12*

For the preparation of a barium lithium silicate of the overall composition 1BaO:2Li₂O:2.2SiO₂, activated with 10% cerium and 1% manganese, a mixture of the following composition is used:

| | Grams |
|---|---|
| Barium carbonate (BaCO₃) | 14.3 |
| Lithium carbonate (Li₂CO₃) | 10.7 |
| Silica (SiO₂) | 9.55 |
| Cerium oxide (CeO₂) | 3.07 |
| Manganese chloride (MnCl₂.4H₂O) | 0.9 |

The materials used are as in Example 5, and the mixture is prepared and fired as in Example 5. The resulting materials shows a good pale rose fluorescence under excitation by 3650° A. excitation.

*Example 13*

For the preparation of a material of the overall composition 1BaO:1SrO:1Li₂O:2SiO₂, activated by 10% cerium and 1.2% manganese, a mixture of the following constituents is made up by shaking the powdered substances together:

| | Grams |
|---|---|
| Barium carbonat (BaCO₃) | 121 |
| Strontium carbonate (SrCO₃) | 90.5 |
| Lithium carbonate (Li₂CO₃) | 45.4 |
| Silica (SiO₂) | 74 |

This mixture is fired in an open silica tray for two hours at 750° C.

The fired powder is ground with 30.75 gms. cerium oxide, and made into a paste with 200 ccs. of an aqueous solution of manganous chloride (containing 10.8 gms. MnCl₂4H₂O). This paste is dried in an oven at 250° C., is then ground, and the resulting powder is fired in a silica tube in hydrogen for one hour at 850° C., again for one hour at 875° C., and finally for one hour at 900° C. After each firing the product is allowed to cool in hydrogen and is ground.

The powder obtained by grinding and sieving the final product shows a strong pale pink fluorescence under 3650 A. radiation.

*Example 14*

For the preparation of a material of the overall composition 1BaO:1SrO:1Lt₂O:1.8SiO₂, activated by 10% cerium and 1% manganese, a mixture of the following constituents is made up by shaking the powdered substances together:

| | Grams |
|---|---|
| Barium carbonate (BaCO₃) | 125 |
| Strontium carbonate (SrCO₃) | 93.5 |
| Lithium carbonate (Li₂CO₃) | 47 |
| Silica (SiO₂) | 68.5 |

This mixture is fired in an open silica tray for two hours at 700° C.

The fired powder is ground with 30.75 gms. cerium oxide and made into a paste with 200 ccs. of an aqueous solution of manganous chloride (containing 9.04 gms. MnCl₂.4H₂O). This paste is dried in an oven at 250° C., is then ground, and the resulting powder is fired in a silica tube in hydrogen for one hour at 800° C., again for one hour at 850° C., and finally for one hour at 875° C. After each firing the product is allowed to cool in hydrogen and is ground.

The powder obtained by grinding and sieving the final product shows a good pale pink fluorescence under 3650 A. radiation.

*Example 15*

For the preparation of a material of the overall composition 1BaO:1SrO:1Li₂O:2.1SiO₂, activated by 10% cerium and 1% manganese, a mixture of the following constituents is made up by lightly grinding the powdered substances together:

| | Grams |
|---|---|
| Barium carbonate (BaCO₃) | 239 |
| Strontium carbonate (SrCO₃) | 179 |
| Lithium carbonate (Li₂CO₃) | 89.6 |
| Silica (SiO₂) | 153 |

This mixture is fired in an open silica tray for two hours at 750° C.

The fired mixture is ground with 61.5 gms. cerium oxide, and made into a paste with a solution of 18 gms. of manganous chloride (MnCl₂.4H₂O) in 500 ccs. of distilled water. This paste is dried in an oven at 200° C., is then ground, and the resulting powder is fired in a silica tube in hydrogen for one hour at 900° C., again for one hour at 915° C., and finally for one hour at 915° C. After each firing the product is allowed to cool in hydrogen and is ground.

The powder obtained by grinding and sieving the final product shows a strong rose-red fluorescence under 3650 A.

We claim:

1. A luminescent silicate of the oxides of lithium and at least one of the metals barium and strontium in which the molar ratio of BaO+SrO+Li₂O:SiO₂ is between 3:1 and 1:1, the molar ratio of BaO+SrO:Li₂O is between 5:1 and 1:5, and the molar ratio of BaO:SrO is from 0:2 to 2:0, activated by about 1–20% by weight of trivalent cerium and 0 to about 5% by weight manganese.

2. A luminescent silicate of the oxides of lithium and at least one of the metals barium and strontium in which the molar ratio of BaO+SrO+Li₂O:SiO₂ is between 3:1.7 to 3:2.3, the molar ratio of BaO+SrO:Li₂O is between 3:1 and 1:3, and the molar ratio of BaO:SrO is from 0:2 to 2:0, activated by about 1–20% by weight of trivalent cerium and 0 to about 5% by weight manganese.

3. A luminescent silicate of the oxides of lithium and at least one of the metals barium and strontium in which the molar ratio of BaO+SrO+Li₂O:SiO₂ is between 3:1 and 1:1, the molar ratio of BaO+SrO:Li₂O is between 5:1 and 1:5, and the molar ratio of BaO:SrO is from 0:2 to 2:0, activated by about 1–20% by weight of trivalent cerium and about 0.5 to 5% by weight manganese.

4. A luminescent silicate of oxides of barium, strontium and lithium in a molar ratio of about 1BaO:1SrO:1Li₂O:2.2SiO₂ activated by about 10% by weight of trivalent cerium and about 1% by weight of manganese.

References Cited in the file of this patent

UNITED STATES PATENTS

| | | |
|---|---|---|
| 2,308,736 | Aschermann | Jan. 19, 1943 |
| 2,376,437 | Leverenz | May 22, 1945 |
| 2,419,902 | Mager | Apr. 29, 1947 |
| 2,476,681 | Overbeek | July 19, 1949 |
| 2,477,329 | De Gier | July 26, 1949 |
| 2,542,349 | Ouweltjes | Feb. 20, 1951 |
| 2,615,850 | McKeag | Oct. 28, 1952 |